Aug. 4, 1931. J. J. N. VAN HAMERSVELD 1,817,722
INDICATING DEVICE
Filed Nov. 9, 1929 7 Sheets-Sheet 1

Aug. 4, 1931.          J. J. N. VAN HAMERSVELD          1,817,722
                            INDICATING DEVICE
                        Filed Nov. 9, 1929        7 Sheets-Sheet 4

Patented Aug. 4, 1931

1,817,722

UNITED STATES PATENT OFFICE

JOHN J. N. VAN HAMERSVELD, OF CLEVELAND HEIGHTS, OHIO, ASSIGNOR TO THE WARNER & SWASEY COMPANY, OF CLEVELAND, OHIO, A CORPORATION OF OHIO

INDICATING DEVICE

Application filed November 9, 1929. Serial No. 405,047.

This invention relates to an indicating device which is associated with mechanism for controlling the rate of movement or speed of a part of a machine to indicate the rate of movement of such part. This invention is an improvement over the indicating device constituting the subject matter of application Serial No. 345,399, filed March 8, 1929 in the name of William J. Burger (now Patent No. 1,758,427, granted May 13, 1930).

As is the case with the Burger indicating device, the present invention has particular utility for use in connection with the control levers of a part of a machine tool as, for example, the levers for controlling the speed or rate of movement of the work spindle forming a part of the head of a lathe, although it is not confined in its field either to a lathe or to a particular part of a lathe, but may be used to advantage with other machine tools or types of machines or devices having a moving part whose rate of movement is controlled by levers or equivalent devices.

In the Burger application the indicating device comprises two indicating members, one in the form of a member carrying suitable indicia and the other in the form of a window through which the rate of movement of the part controlled can be observed, both of these members being movably supported and associated with a series of levers employed in the control of a part of the machine. With the construction as illustrated in the Burger application the indicating members are supported independently of the levers on a bracket appropriately arranged and constructed to accommodate the movements of the indicating members, as well as the movements of the levers, the bracket itself being mounted on a suitable stationary part of the machine which, in the case of the machine shown in the Burger application, is the headstock of a lathe. This construction, while quite novel and useful, is such that its greatest utility is found when the indicating device is applied when the machine is built and is not easily adaptable to machines already in use.

One of the objects of the present invention is to provide an improvement over that shown in the Burger application, which is simpler, less expensive and more readily applied.

A further object is to provide an arrangement wherein the indicating members are supported by the levers themselves so that it will be possible and convenient to equip machines already in use having a similar arrangement of levers but without any indicating device, with an indicating device involving the invention by simply replacing the whole set or group of levers with a new group provided with the indicating members.

The above and other objects are attained by my invention which may be briefly summarized as consisting in certain novel combinations and arrangements of parts and details of construction which will be described in the specification and set forth in the appended claims.

Although, as above stated, my invention is not necessarily confined in its application to the levers or other member for controlling any particular part of any particular kind of machine, I have illustrated the invention as applied to the head-stock of a lathe in association with the levers for controlling the direction of rotation and the rate of rotation of the work spindle thereof, inasmuch as the invention is especially useful when so used.

Referring now to the construction illustrated in Figs. 1 to 8, 20 represents the headstock of the lathe in which is supported the work spindle 21 which, as usual, is driven at a plurality of speeds in either direction. Inasmuch as any suitable gearing may be employed for rotating this spindle I have not deemed it important to illustrate all the gearing and it will be sufficient to state that the spindle is driven from a clutch shaft 22 provided with a clutch which is controlled by a shifter or yoke 23, the clutch shaft driving a countershaft 24 either by direct gearing for forward rotation or through an idler 25 for reverse rotation. This countershaft through a three-step cone, indicated at 26, drives a countershaft 27 which drives a sleeve, indicated at 28, supported and freely rotatable on the spindle, and this sleeve in turn drives through a two-step cone 47 (see Fig. 4) a countershaft 29 which, in turn, drives the work spindle 21 through a two-step cone 29ᵃ (see Fig. 3). The gearing of the head-stock and the clutch may be identical with the gearing and clutch illustrated and described in the Burger application, but inasmuch as these parts constitute no part of the present invention, more detailed illustration herein is believed unnecessary.

To control the clutch and the three gear cones, by which variety of speeds may be imparted to the work spindle 21 for both forward and reverse rotation, I employ in the two embodiments illustrated in Figs. 1 to 12 four levers which are in this instance mounted on top of the head-stock in two groups of two coaxial levers each. In the embodiment of the invention illustrated in Figs. 1 to 8 the levers are designated respectively 30, 31, 32 and 33. The levers 30 and 31 are coaxially mounted, one above the other, and the levers 32 and 33 are coaxially mounted, one above the other, rearwardly of the two levers 30 and 31.

The upper forward lever 30 is the clutch controlling lever. It has a neutral position, indicated in Fig. 3, in which event the clutch is disengaged and it is adapted to be swung from neutral position in either direction to engage the clutch for forward or reverse rotation. In this instance the lever 30 is mounted on a bearing pin 34 carried by an inner lever member 35 keyed or otherwise secured to a vertical rock-shaft 36 to the lower end of which is secured a clutch shifting arm 37. This lever 30 is capable of a slight vertical rocking movement as well as a horizontal swinging movement so that the lever when released by the operator's hand, when in neutral position, will be automatically locked in that position against accidental movement in either direction. Accordingly, the lever 30 has a downward extension 38 beyond the bearing pin 34 and the lower end of this extension is adapted to engage in a notch 39 in a boss which surrounds the rock-shaft 36. A spring, indicated at 40, is adapted to elevate the outer or forward end of the lever and cause the extension 38 to engage in the notch 39 when the operator moves his hand from the lever when it is in neutral position. On the other hand, when the operator places his hand on the outer lever 30 the extension 38 is automatically disengaged from the notch by the weight of his hand so that the lever can be swung in either direction.

The lever 31, which is coaxial with lever 30, is secured to a sleeve 41 which surrounds the rock-shaft 35. To the lower end of this sleeve is secured a cone shifting arm 42 for shifting the two-step cone 29ᵃ on countershaft 29. This lever 31 as well as the other two levers 32 and 33 function in connection with the indicating members to be referred to presently.

The upper lever 32 of the rear pair of levers (see Fig. 4) is secured to a rock-shaft 43 mounted in the top of the head-stock and at its lower end provided with a shifting arm 44 for shifting the three-step gear cone 26 on countershaft 24. The lower lever 33 of the rear pair of levers is secured to a sleeve 45 surrounding the rock-shaft 43 and provided in its lower end with a shifting arm 46 for shifting the two-step gear cone 47 on countershaft 29.

Thus, by means of the four levers, 30 to 33, the work spindle 21 may be stopped or started and rotated either forwardly or reverse at a plurality of speeds obtainable by shifting the speed change levers 31, 32 and 33. In this instance there are twelve speeds forward and reverse (although this is immaterial to the invention) levers 31 and 33 being two-position levers and lever 32 being a three-position lever.

Figure 1:
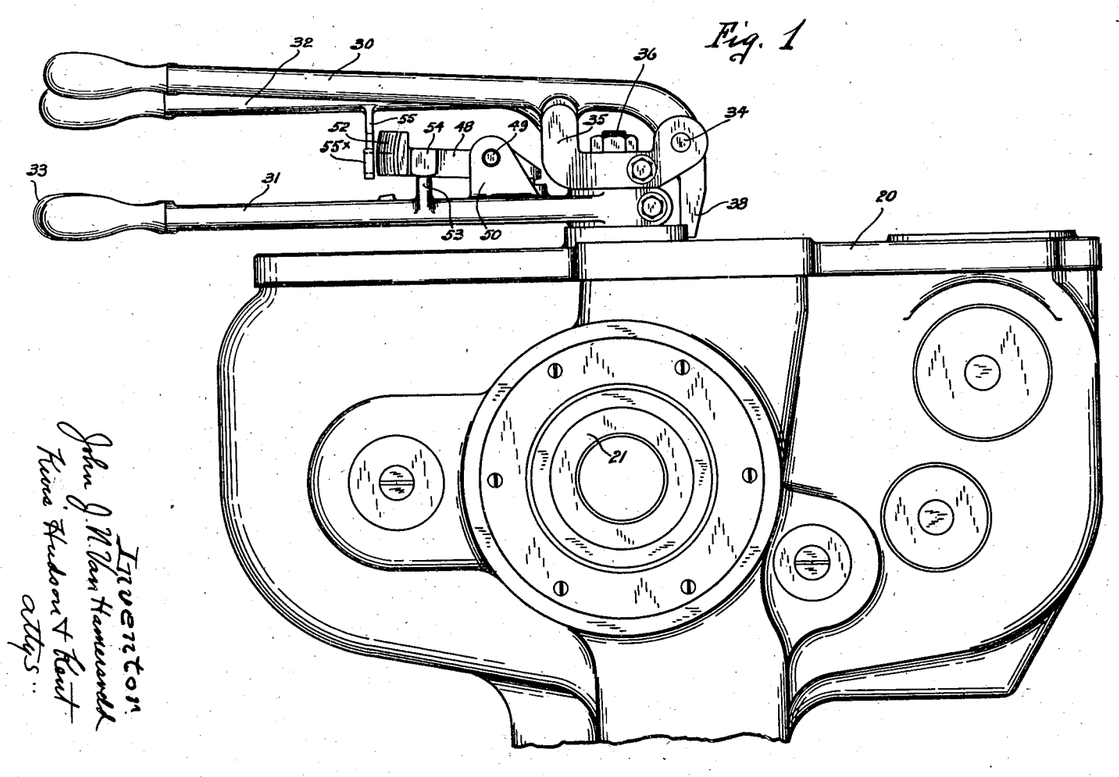
Fig. 1 is an elevation of a lathe head-stock equipped with my invention, looking toward the work holding end of the spindle.
Figure 2:
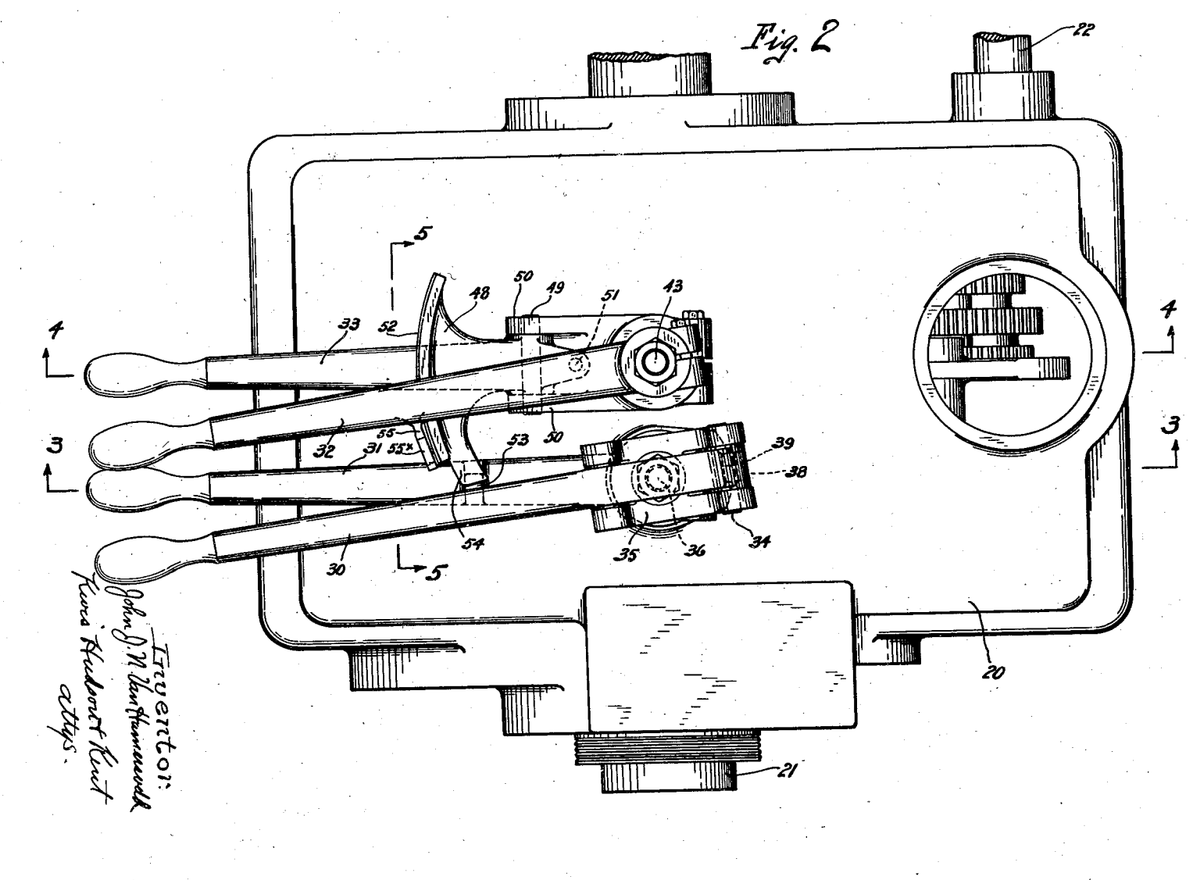
Fig. 2 is a plan view of the same.
Figure 3:
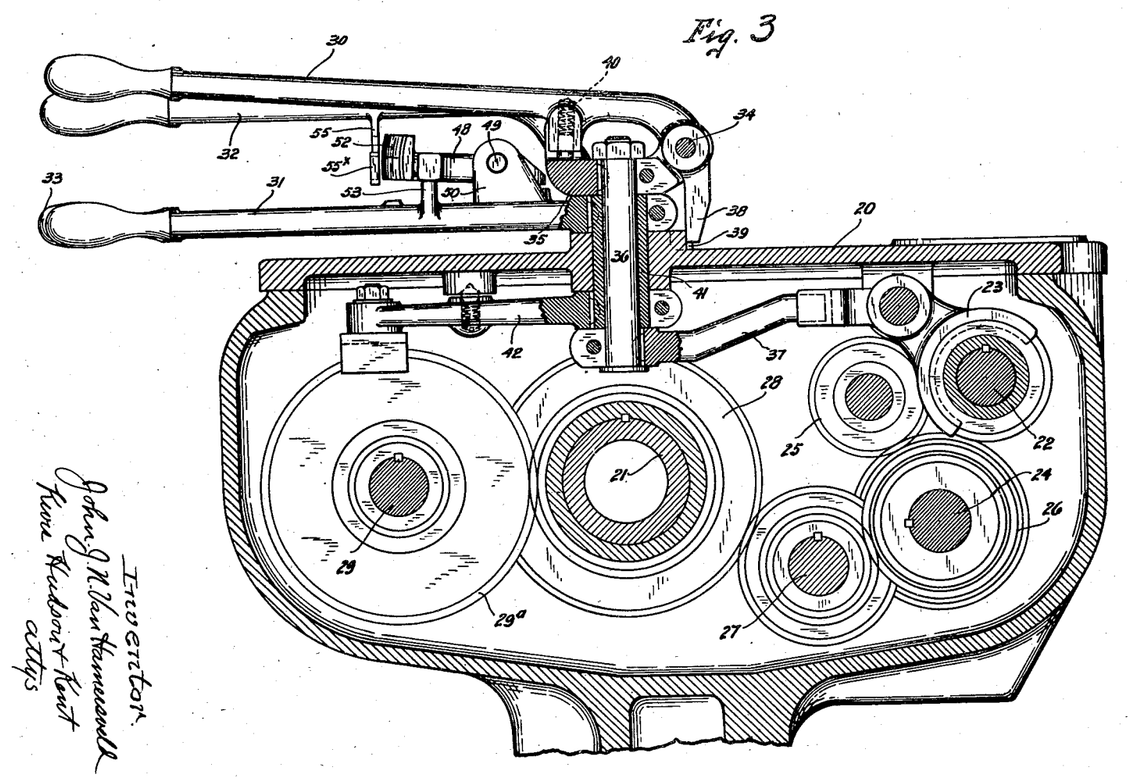
Fig. 3 is a vertical sectional view substantially along the line 3—3 of Fig. 2.
Figure 4:
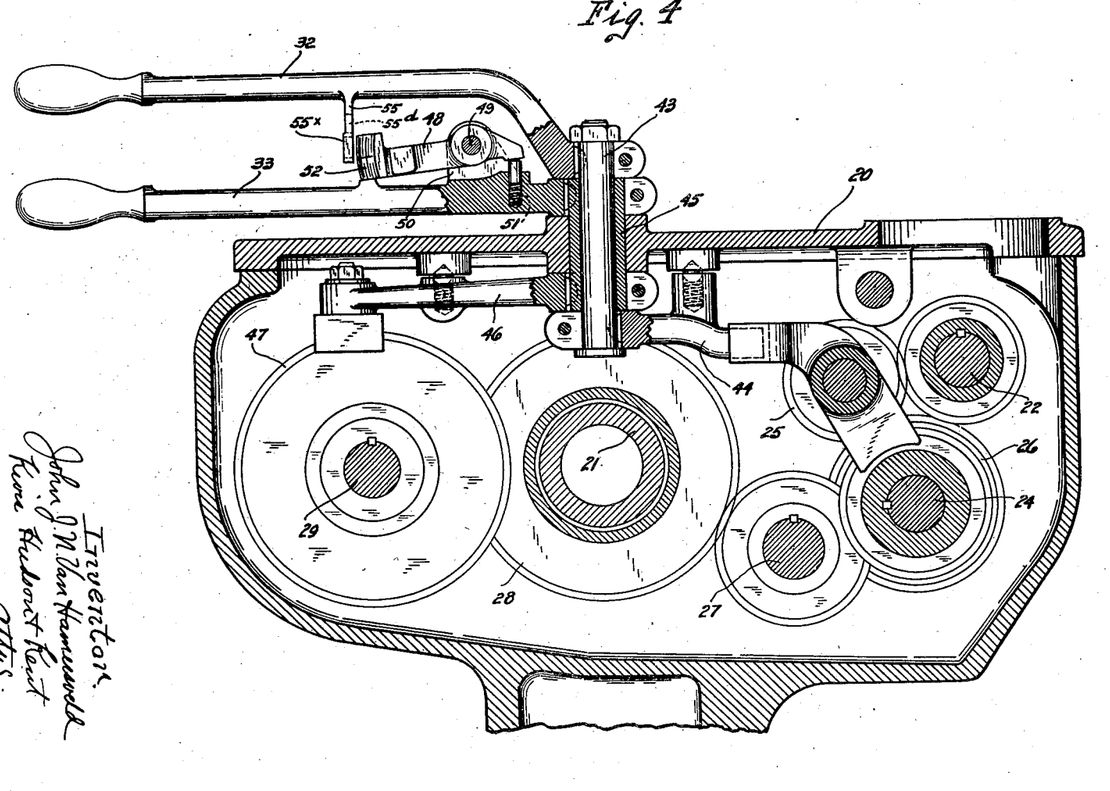
Fig. 4 is a similar view substantially along the line 4—4 of Fig. 2.
Figure 8:
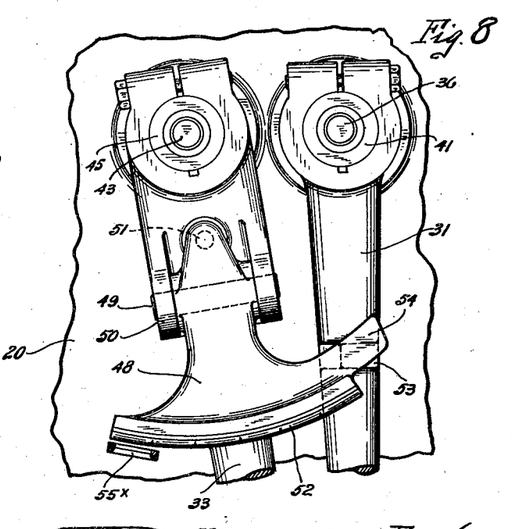

Coming now more directly to the present invention, I employ two indicating members one being in the form of an indicia carrying member 48 which, in this instance, is mounted on a bearing pin 49 to allow a vertical rocking movement, which bearing pin is mounted in a pair of upstanding ears 50 on the lower lever 33 of the second or rear group as most clearly shown in Fig. 4. Although the forward end of this indicating member 48 may be maintained in its lower position by gravity, I prefer to supplement gravity by a spring 51. As will be best seen by reference to Figs. 5, 6, 7 and 8 the indicating member 48 has an arc-shaped front face which is provided with two rows of characters 52 which in this instance are numerals designed to indicate the revolutions per minute of the work spindle. At this point I might say that I do not regard it essential that the rate of movement be necessarily indicated by numerals, as other suitable indicia, which will convey the correct information to the operator, may be employed. Two rows of indicia are provided on the front face of indicating member 48 for the reason that this indicating member is adapted not only to be swung laterally with lever 33, which carries the same, but is adapted to be rocked vertically so as to elevate the front face of the indicating member from the position shown in Fig. 4 to the position shown in Fig. 3. To bring about this vertical rocking movement of the indicating member 48, the lower lever 31 of the first or forward group is provided with a cam lug 53 which, when the lever 31 is swung in a given direction, engages underneath an extension 54 of the indicating member 48 so as to elevate its forward end, as shown in Figs. 3, 6 and 8.

Figure 5:
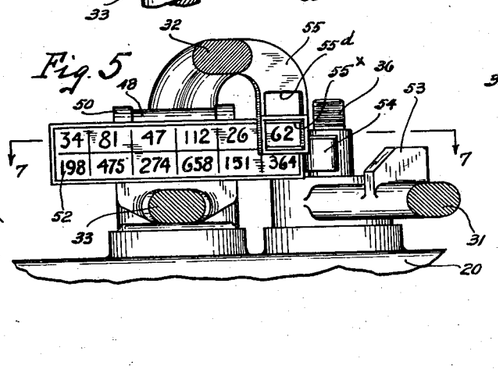
Fig. 5 is a fragmentary sectional view substantially along the line 5—5 of Fig. 2 omitting the clutch controlling lever which in itself is not instrumental in shifting either of the indicating members, the parts being shown on an enlarged scale.
Figure 6:
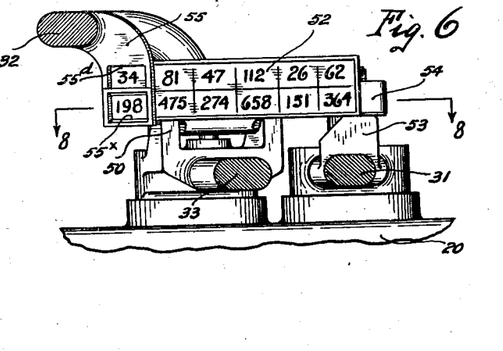
Fig. 6 is a similar view showing the levers and the indicating members in a different position than indicated in Fig. 5.
Figure 7:
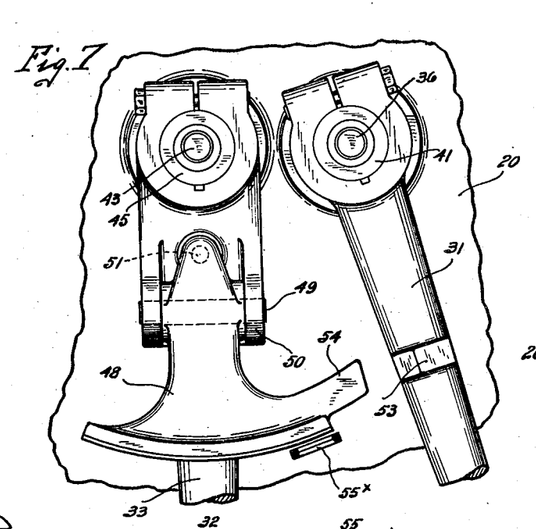
Figs. 7 and 8 are sectional plan views on the same scale as Figs. 5 and 6 substantially along the lines 7—7 of Fig. 5 and 8—8 of Fig. 6, each of these two views omitting the upper levers.

A second indicating member 55 is carried by and extends downwardly from the upper lever 32 of the second or rear pair, this indicating member at its lower end being formed with an opening 55<sup>x</sup> constituting a window through which the particular indicia directly behind it can be seen by the operator when standing at the front of the machine, this window being clearly shown in Figs. 5 and 6 in two different positions with reference to the indicating member 48. The indicating member 55 may if desired be provided with an opening 55<sup>d</sup> which is above the window 55<sup>x</sup> so that the indicating member will not obstruct the operator's view of any of the indicia, it being understood that it is through the window or lower opening 55<sup>x</sup> that the operator observes the rate of movement of the work spindle. Inasmuch as lever 32 is adapted to shift a three-step gear cone and is, therefore, a three-position lever, it will be obvious that the window or indicating member 55 will be positioned in front of three different characters in either the upper row or lower row of indicia when the lever 32 is in its three different positions. When this window is moved from one of its positions to the other it traverses two spaces on the front indicia carrying face of indicating member 48, i. e., in passing from one position to the other it will skip one indicating numeral or other character. In other words, in one shift of lever 32 the window will move from a position shown in Fig. 5, which as illustrated shows the numeral 62 back of the window, to a position such that the numeral 112 is back of the window, and when again shifted it will be in front of the numeral 81. On the other hand, the lower lever 33 carrying the indicia carrying member, when shifted to the right or left, is always moved a distance equal to one space on the front face of the indicating member 48 so that by shifting the two levers of the rear group 32 and 33 (while the lever 33 remains stationary) the window can be positioned in front of each of the indicating characters of the upper row of characters and when lever 31 is also shifted, so as to elevate the front face of the indicating member 48, the lower row of indicating characters is brought opposite or to the level of the window of the indicating member 55 so as to make it possible for the window to be positioned in front of each of the indicating characters of the lower row.

By the arrangement wherein the window is shifted two spaces along or over the indicia by the movement of the lever 31 which shifts the three-step gear cone 26, while the indicia carrying member 48 is shifted one space by the similar movements of the lever 33 which controls the two-step gear cone 47, and wherein the front face of the indicia carrying member 48 is rocked vertically from one row of indicia to the other by the movements of the lever 31 which controls the front two-step gear cone 29<sup>a</sup>, together with the proper arrangement of the indicia characters, the correct speed or rate of movement of the spindle will always appear behind the window regardless of what levers which control the spindle speed are shifted.

The situation wherein the window is moved two spaces, whereas the indicia carrying member is moved one space, may, with certain designs and sizes of machines, be accomplished by having the lever carrying the window moved through a distance twice the distance which the lever carrying the indicia carrying member moves when the levers are moved from one operating position to another. The distance that the levers are moved from one operating position to another will depend upon the size and design of the machine, including the available space for shifting the gear cones and the length of the lever arms which actuate them. In some instances it is not feasible to have one lever moved twice the distance of another to bring about twice the length of movement of the window with reference to the movement of the indicia carrying member. In Figs. 9 to 12 I have shown an arrangement wherein it is possible to obtain the desired relative lengths of movement of the window and of the indicia carrying member regardless of the throws of the levers carrying or controlling them as they are moved from one operating position to another. With this construction the levers are the same in movement and arrangement as with the first construction, but in Figs. 9 and 10 the levers are designated 30ª, 31ª, 32ª and 33ª.

Figures 9, 11:
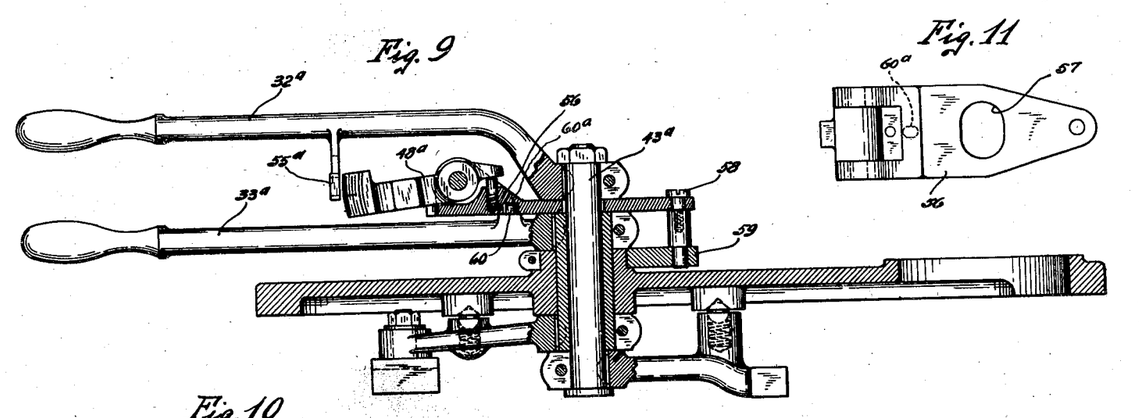
Fig. 9 is a sectional view corresponding to the upper part of Fig. 4, showing a modification.
Figs. 11 and 12 are detail views of parts incorporated in the modification illustrated in Figs. 9 and 10.
Figure 10:
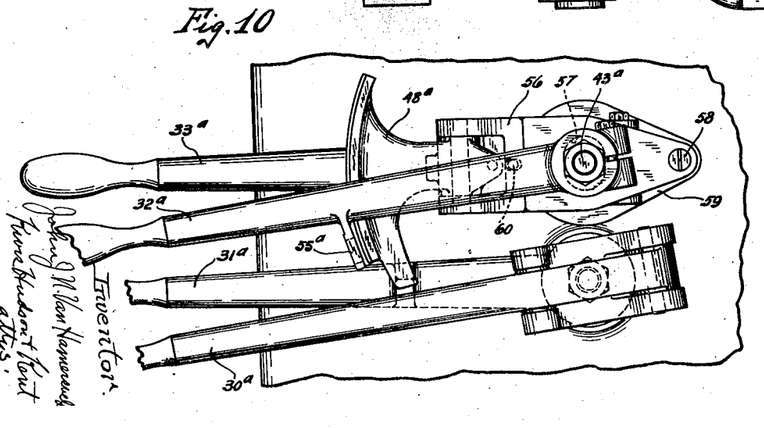
Fig. 10 is a plan view of the same corresponding to a portion of Fig. 2, showing the same modification.
Figure 12:
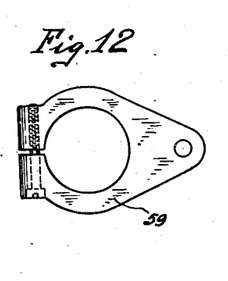

The difference between the two constructions is chiefly in the fact that in Figs. 9 and 10 the indicia carrying member 48ª is given only a portion of the movement which is imparted to the lever 33ª which carries and shifts it. In this instance the indicia carrying member is mounted for vertical rocking movement on an arm 56, which rests upon the lever and loosely surrounds the rock-shaft 43ª to which the lever 32ª is attached, this arm 56 having an elongated opening 57 through which the rock-shaft 43ª extends, so that the latter will not interfere with the movement of the arm 56.

The rear end of the arm is pivoted at 58 on a bracket 59 which is clamped to the boss of the head-stock, through which the rock-shaft 43ª extends and forwardly of the rock-shaft, and also a suitable distance from the rock-shaft the lever 33ª has a movement imparting connection with the arm 56, the same being accomplished in this instance by a pin 60 on the lever extending up into a slot 60ª on the under side of the arm 56. In other words, the movement transmitting connection between the lever 33ª and the arm 56 is at some point between the pivot of the arm 56 at the rear end of the latter and the indicia carrying face of the indicating member 48ª. The proportions will be so selected that, regardless of the relative throws of the levers 32ª and 33ª, the window of the indicating member 55 on lever 32ª moves two spaces with reference to the indicia, while the front face of the indicia carrying member moves one space. The construction and manner of operation of the embodiment shown in Figs. 9 and 10 are otherwise the same as the embodiment just described, and further description of the operation will be unnecessary.

Figures 13, 14:
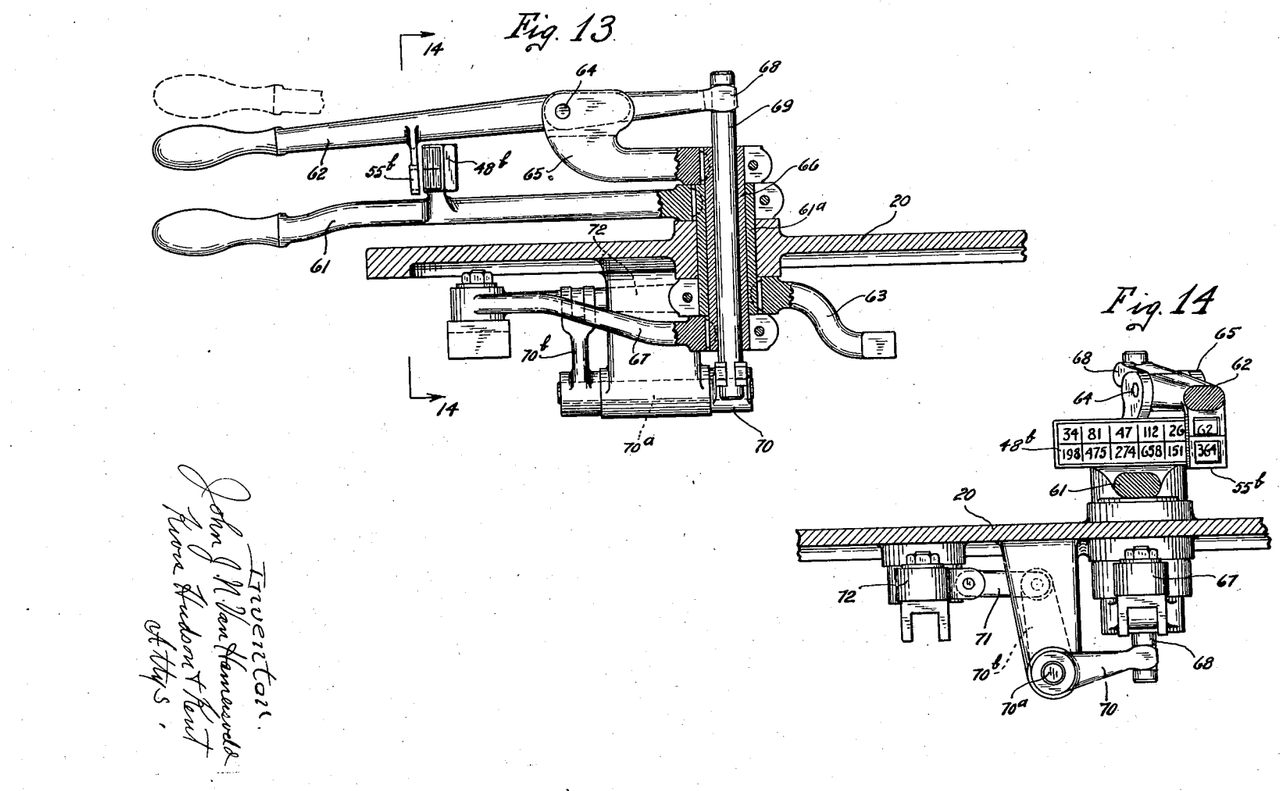
Fig. 13 is a view corresponding to Figs. 4 and 9 showing a still further modification.
Fig. 14 is a fragmentary secional view substantially along the line 14—14 of Fig. 13.

In Figs. 13 and 14 I have shown a modification wherein the same results are obtained as previously described, with only two controlling levers in place of three, although the same speed changes are obtainable as with the three speed-controlling levers of the embodiments first described. In this instance I employ two levers 61 and 62 to accomplish the several speed changes. The lever 61 carries the indicia carrying member 48ᵇ, whereas the lever 62 carries the window 55ᵇ. The indicia carrying member 48ᵇ and the window 55ᵇ have the same lateral swinging motions and a relative rocking motion, so that the window will be positioned in line with either the upper row or lower row of indicia characters but, in this instance, instead of rocking the indicia carrying member, the window is shifted up or down, from the lower to the upper row of indicia or vice versa.

The lever 61 is, as before, secured to a sleeve 61ᵈ which, at its lower end, is connected to an arm 63 for shifting a gear cone which may be a three-step cone as before, but the lever 62 is mounted for lateral swinging motion and also vertical rocking motion or from the position shown in full lines to the position shown in dotted lines (see Fig. 13), and to that end it is pivoted at 64 on an inner lever member or bracket 65, which is secured to a sleeve 66, which has secured to its lower end a shifting arm 67 adapted to shift a gear cone which may be a two-step cone. The lever 62 has a portion extending beyond the pivot point 64 and this is connected at 68 to a vertically sliding member 69 suitably connected at its lower end to cone shifting means. In this instance the lower end of the member 69 is connected to an arm 70 connected to a shaft 70ª, which forms with an arm 70ᵇ connected to the other end of the shaft 70ª a bell crank, to which is connected one end of a link 71 which is at its other end connected to a shifting arm 72 employed in shifting a suitable gear cone which may be a two-step cone. Thus by constructing the lever 62 so that it is susceptible of two movements adapted to be given to it independently, these two levers 61 and 62 will accomplish precisely the same results as the three speed changing levers 31, 32 and 33 or 31ª, 32ª and 33ª. Likewise, with this arrangement, movements are imparted to the two indicating members 48ᵇ and 55ᵇ, equivalent to the movements imparted to the indicating members of the other embodiments of my invention. By the expression "equivalent movements" I mean movements by which the parts are moved relatively in a manner such that in effecting any of the possible speed changes the rate of movement will be indicated through the window 55ᵇ.

It is not essential to the invention that the window be always moved through two spaces while the indicia carrying member is moved through one space, for the same results can be obtained with, of course, the proper arrangement of the indicia characters, if the reverse arrangement is used; that is to say, if the indicia carrying member is moved through two spaces while the window is moved through one space, when the levers carrying them are given their usual throws from one operative position to another, and the latter arrangement is contemplated in the embodiment or modification last described if the lever 61 is adapted to shift a three-step gear cone and the lever 62 to shift two two-step gear cones by its laterally swinging and vertical rocking movements.

It will be seen from the above that my invention is susceptible of numerous modifications in the arrangement and manner of mounting the indicating members, and that these members can be associated with and operated by speed controlling levers of different numbers and arrangement.

While I have shown certain forms of the invention, I do not wish to be limited to any of the embodiments illustrated, but aim in my claims to cover all modifications which do not involve a departure from the spirit and scope of the invention.

Having thus described my invention, what I claim is:

1. An indicator associated with the members for controlling a part of a machine, comprising separate indicating members carried by the control members and cooperating with one another to directly indicate the rate of movement of the controlled part.

2. An indicator associated with the control members for controlling a part of a machine, comprising an indicating member carried by one of the control members and movable in two different directions, and a second indicating member carried by another of the control members and cooperating with the first indicating member.

3. An indicator associated with the control members for controlling a part of a machine, comprising an indicating member carried by one of the control members and capable of a rocking movement in two different directions, and a second indicating member carried by another of the control members and cooperating with the first indicating member.

4. An indicator associated with the control members for part of a machine, comprising a plurality of indicating members which indicate directly the rate of movement of said part and each having rocking movements imparted by the control members.

5. An indicator associated with the control members for part of a machine, comprising a plurality of indicating members supported by the control members and each having rocking movements imparted thereto by the latter.

6. An indicator associated with the control members for part of a machine, comprising a plurality of indicating members supported by the control members and having rocking movements imparted thereto by the latter, one of said members being given rocking movements in two different directions.

7. An indicator associated with the control members for part of a machine, the control members being coaxially arranged and the indicating members being operatively associated therewith so that each will have rocking movements imparted thereto.

8. An indicator associated with the control members of part of a machine, the control members being coaxially arranged for rocking movement and the indicating members being supported thereby and each having rocking movements imparted thereto.

9. An indicator associated with the control members of part of a machine, the control members being coaxially arranged for rocking movement and the indicating members being supported thereby and having rocking movements imparted thereto, one of the indicating members being arranged for rocking movement in two different directions.

10. An indicator associated with the control members for part of a machine and having operative connections with the control members, wherby one indicating member is given a greater rocking movement than the other.

11. An indicator associated with the control members for part of a machine and having operative connections with the control members, whereby one indicating member is given a rocking movement of greater extent than the rocking movement imparted to the second indicating member and whereby one of said members is given a rocking movement in a direction relative to the other.

In testimony whereof, I hereunto affix my signature.

JOHN J. N. VAN HAMERSVELD.